(12) United States Patent
Schroter et al.

(10) Patent No.: US 6,775,898 B1
(45) Date of Patent: Aug. 17, 2004

(54) METHOD FOR ASSEMBLING A POSITION MEASURING DEVICE AND A POSITIONING MEANS FOR THE ASSEMBLY

(75) Inventors: Andreas Schroter, Traunstein (DE); Horst Röder, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/762,754

(22) PCT Filed: Jul. 22, 1999

(86) PCT No.: PCT/EP99/05223

§ 371 (c)(1),
(2), (4) Date: Apr. 16, 2001

(87) PCT Pub. No.: WO00/08418

PCT Pub. Date: Feb. 17, 2000

(30) Foreign Application Priority Data

Aug. 8, 1998  (DE) ......................................... 198 36 003

(51) Int. Cl.[7] .............................. B23Q 3/00; B21D 39/03
(52) U.S. Cl. ............................... 29/467; 29/468; 29/464; 29/428
(58) Field of Search ........................... 29/464, 462, 467, 29/468, 522.1, 559, 729, 428; 356/395, 617; 33/1 N, 707, 1 PT

(56) References Cited

U.S. PATENT DOCUMENTS

| 4,095,903 | A |   | 6/1978 | Feichtinger |
| 4,326,128 | A | * | 4/1982 | Klein .................. 250/231 |
| 4,495,700 | A |   | 1/1985 | Ernst |
| 4,509,262 | A |   | 4/1985 | Nelle |
| 4,530,155 | A |   | 7/1985 | Burkhardt et al. |
| 4,564,294 | A |   | 1/1986 | Ernst |
| 4,573,000 | A |   | 2/1986 | Nelle |
| 4,660,288 | A |   | 4/1987 | Dangschat |
| 4,663,851 | A |   | 5/1987 | Feichtinger |
| 4,794,250 | A |   | 12/1988 | Togami |
| 5,655,311 | A |   | 8/1997 | Affa |
| 5,758,427 | A |   | 6/1998 | Feichtinger |
| 5,981,940 | A |   | 11/1999 | Setbacken et al. |
| 6,002,126 | A |   | 12/1999 | Feichtinger |
| 6,194,710 | B1 |  | 2/2001 | Mitterreiter |

FOREIGN PATENT DOCUMENTS

| DE | 37 40 744 | 6/1988 |
| DE | 94 17 467.9 | 2/1995 |
| EP | 0 177 711 | 4/1986 |
| EP | 0 280 390 | 8/1988 |
| EP | 0 762 082 | 3/1997 |
| EP | 0 841 539 | 5/1998 |

OTHER PUBLICATIONS

Pending Paten Application Assigned to Dr. Johannes Heidenhain GmbH: Serial No.: 09/354,047, Filing Date: Jul. 15, 1999, Inventor: Mitterreiter.

Pending Patent Application Assigned to Dr. Johannes Heidenhain GmbH: Serial No.: 09/666,742, Filing Date: Sep. 20, 2000, Inventor: Tondorf et al.

* cited by examiner

Primary Examiner—John C. Hong
(74) Attorney, Agent, or Firm—Brinks Hofer Gilson & Lione

(57) ABSTRACT

A positioning device for setting the scanning distance between a scanning element and a scale of a position measuring device, the positioning device including a first part that is fixed in at least one direction of motion along a scanning distance directly or indirectly to the scale and a second part that is fixed in at least one direction of motion along the scanning distance directly or indirectly to the scanning element, wherein the first or second part is displaceable relative to the other part in the direction of the scanning distance, and the displacement distance is defined. The first or second part includes a receptacle that is clamped to a face, extending in the direction of the scanning distance, of the scale or to a support of the scale, or to the scanning element or to a support of the scanning element.

28 Claims, 7 Drawing Sheets

METHOD FOR ASSEMBLING A POSITION MEASURING DEVICE AND A POSITIONING MEANS FOR THE ASSEMBLY

Applicants claim, under 35 U.S.C. §§ 120 and 365, the benefit of priority of the filing date of Jul. 22, 1999 of a Patent Cooperation Treaty patent application, copy attached, Serial Number PCT/EP99/05223, filed on the aforementioned date, the entire contents of which are incorporated herein by reference, wherein Patent Cooperation Treaty patent application Serial Number PCT/EP99/05223 was not published under PCT Article 21(2) in English.

Applicants claim, under 35 U.S.C. § 119, the benefit of priority of the filing date of Aug. 8, 1998 of a German patent application, copy attached, Ser. No. 198 36 003.7, filed on the aforementioned date, the entire contents of which is incorporated herein by reference.

BACKGROUND OF THE INVENTION

1. Field of the Invention

The invention relates to a method for assembling a position measuring device, and to a positioning device for setting the scanning distance of a position measuring device.

2. Description of the Related Art

In position measuring devices, a scale is scanned by a scanning element. In this scanning, position-dependent electrical scanning signals are obtained that are delivered to a following electronic device, such as a counter, or a numerical controller. The quality of the scanning signals depends on the scanning distance, and it is therefore necessary to install the scanning element at a precisely defined distance relative to the scale.

In European Patent Disclosure EP 0 177 711 B1, a position measuring device is described in which a scanning element in the form of a scanning division is displaceably supported in a guide for setting the scanning distance and can be stopped in every position. The requisite scanning distance is predetermined by a spacing foil that is inserted during the assembly between the scale and the scanning division. The displacement of the scanning division takes place until clamping of the foil; after that, the scanning division is fixed, and the foil is removed.

A disadvantage of this known position measuring device is the necessity of a separate foil as a spacer and of laterally removing a clamped foil.

In European Patent Disclosure EP 0 280 390 A1, a position measuring device in the form of a rotary transducer that has no bearing of its own is known. Such rotary transducers are known as built-in rotary transducers. In built-in rotary transducers, the relative position of the scanning unit and the disk is not defined until the transducer has been mounted on the objects to be measured. To simplify this attachment, a fixation element is integrated with the rotary transducer and is contact with the hub of the disk and defines the position of the disk during the attachment process. Once the disk has been mounted on the one object to be measured and the scanning unit has been mounted on the other object to be measured, the fixation element is removed from the hub.

From European Patent Disclosure EP 0 841 539 A1, a position measuring device is known in which a scanning element is supported on a support displaceably from a first reference position to a second reference position. For the displacement, a positioning device is integrated with the support, and with the positioning device the scanning element, after the mounting of the support on an object to be measured, is moved from the first reference position to the second reference position.

This method has the disadvantage that a positioning device must be integrated with every position measuring device, and that the scanning element must be movably supported on the support.

SUMMARY OF THE INVENTION

It is therefore the object of an present invention to disclose a method with which simple mounting and adjustment of a scanning element relative to a scale are assured.

The above object and advantage is attained by a method for assembling a position measuring device, in which a scanning element is fastened to a first object, and a scale including a measurement division is fastened to a further object, the fastening being done while maintaining a predetermined scanning distance between the measurement division and the scanning element. The scanning distance is set by positioning the scanning element at a first reference position relative to the scale, positioning first and second parts of a positioning device at a first reference position, fixing the first part of the positioning device directly or indirectly to the scale and fixing the second part of the positioning device directly or indirectly to the scanning element in a direction of motion along the scanning distance. Moving the first part of the positioning device relative to the second part of the positioning device by a predetermined distance in the direction of the scanning distance so that the scanning element is put into a second reference position relative to the scale, in which position the requisite scanning distance is accomplished.

Another object is to disclose a positioning device with which the requisite scanning distance can be set in a simple way during assembly.

The above object and advantage is attained by a positioning device for setting the scanning distance between a scanning element and a scale of a position measuring device, the positioning device including a first part that is fixed in at least one direction of motion along a scanning distance directly or indirectly to the scale and a second part is fixed in at least one direction of motion along the scanning distance directly or indirectly to the scanning element, wherein the first or second part is displaceable relative to the other part in the direction of the scanning distance, and the displacement distance is defined. The first or second part includes a receptacle that is clamped to a face, extending in the direction of the scanning distance, of the scale or to a support of the scale, or to the scanning element or to a support of the scanning element.

Other advantages of the present invention are in particular that the scanning distance can be set by a positioning device that can be used for many position measuring devices. The position measuring device itself can be simple and economical in structure.

The present invention will be described in detail in terms of exemplary embodiments.

Shown are

DESCRIPTION OF THE PREFERRED EMBODIMENT(S)

Figure 1:
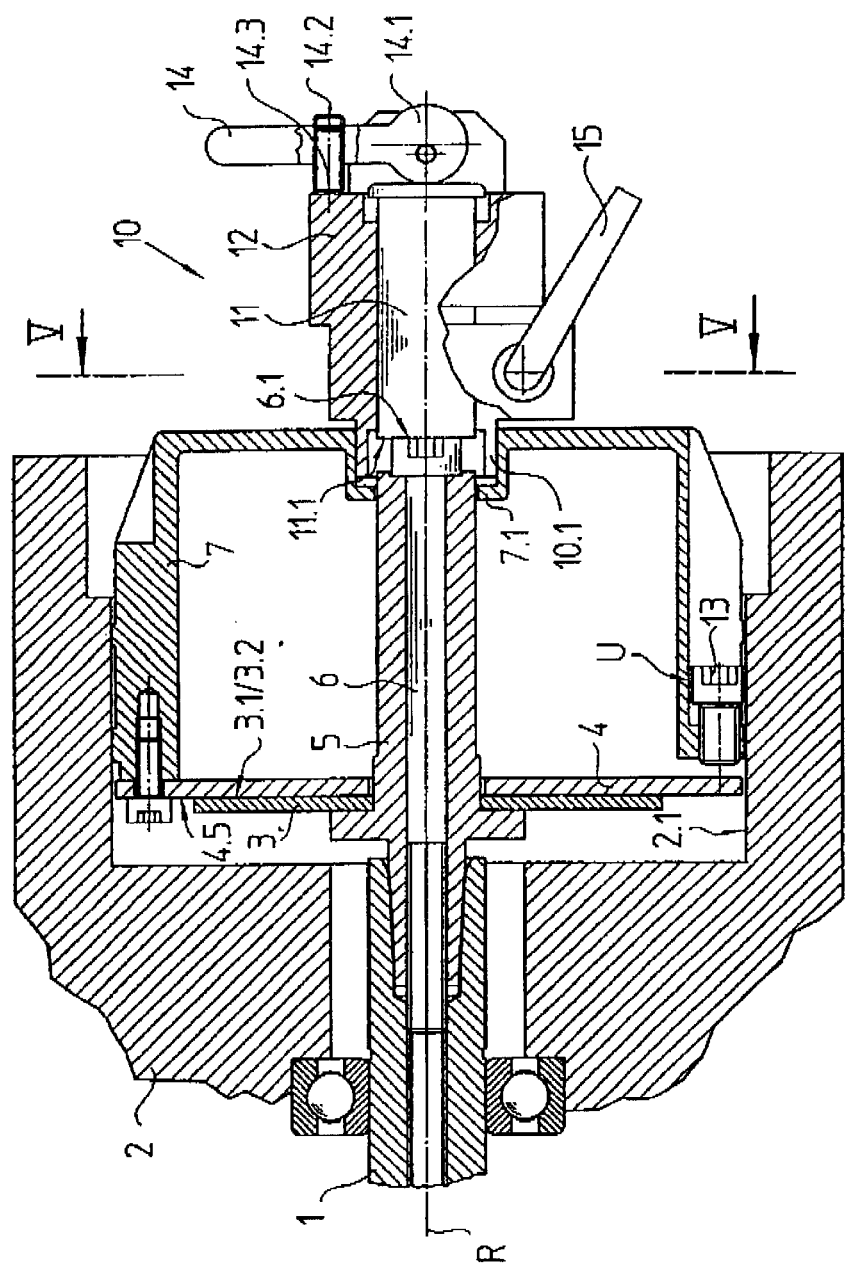
FIG. 1 shows a first example of an angle measuring device, with a positioning device according to the present invention; in section in a first assembly position.

In FIGS. 1–5, a first exemplary embodiment of an angle measuring device for measuring the angular position of a one object 1 relative to a another object 2 is shown. The first object 1 is, for instance, a stationary part of a motor, hereinafter called the stator 2. The second object 1 is a shaft 1 of the motor, whose rotary angle relative to the stator 2 is to be measured. To that end, a scale in the form of a disk 3 is fastened to the shaft 1. In this example, this fastening is done by a screw 6, but it can also be done by adhesive bonding, pressing or arbitrary clamping methods. The disk 3, on a plane 3.1, has a grating 3.2 or encoding, which can be scanned photoelectrically, magnetically, capacitively, or inductively.

The grating 3.2 is scanned in the position measurement by a scanning element 4 in a manner known per se. This scanning produces position-dependent electrical scanning signals, which are delivered to a following electronic device.

In FIG. 1, a first assembly position of the angle measuring device is shown. Here the disk 3 is coupled to a hub 5 and the hub 5 is coupled to the shaft 1 by the screw 6 in a rotationally rigid manner. In this example, the hub 5 is at the same time the transducer shaft. After this coupling operation, the scanning element 4 is put in a first reference position relative to the disk 3. This first reference position is predetermined by the plane 3.1, as an axially acting stop face of the disk 3, and by an axial stop face 4.5, cooperating with it, of the scanning element 4. This reference position can also be determined by other axially acting stop faces between the rotor unit, or support parts of this rotor unit (disk 3, hub 5, screw 6, shaft 1 or second object 2 as a support part of the rotor unit) that are axially stationary thereto, and the stator unit (scanning element 4 or support 7 of the scanner element 4) of the angle measuring device.

In this position, a positioning device 10 for setting the scanning distance D is used. It includes two parts 11 and 12 that are movable axially relative to one another. By the displacement of the part 11 relative to the part 12, the part 11 is moved from a first reference position to a second reference position. The two reference positions and thus the displacement distance are predetermined by the construction of the positioning device 10. When the two parts 11 and 12 are in the first reference position to one another, the positioning device 10 is moved to the angle measuring device, and the first part 11 is fixed in at least an axial direction of motion to a part 3, 5, 6 of the rotor unit, and the second part 12 is fixed to a part 4, 7 of the stator unit, again in at least one axial direction of motion. The axial fixation of the first part 11 is effected by contact of an axially acting stop face 11.1 of the part 11 with an axially acting stop face 6.1 of the screw 6. The axial fixation of the second part 12 is effected by radially clamping the part 12 to the support 7. To that end, the positioning device 10 has an annular receptacle 10.1, which can be spread open by an actuator 15 and clamped to an axially extending face of the support 7.

Figure 2:
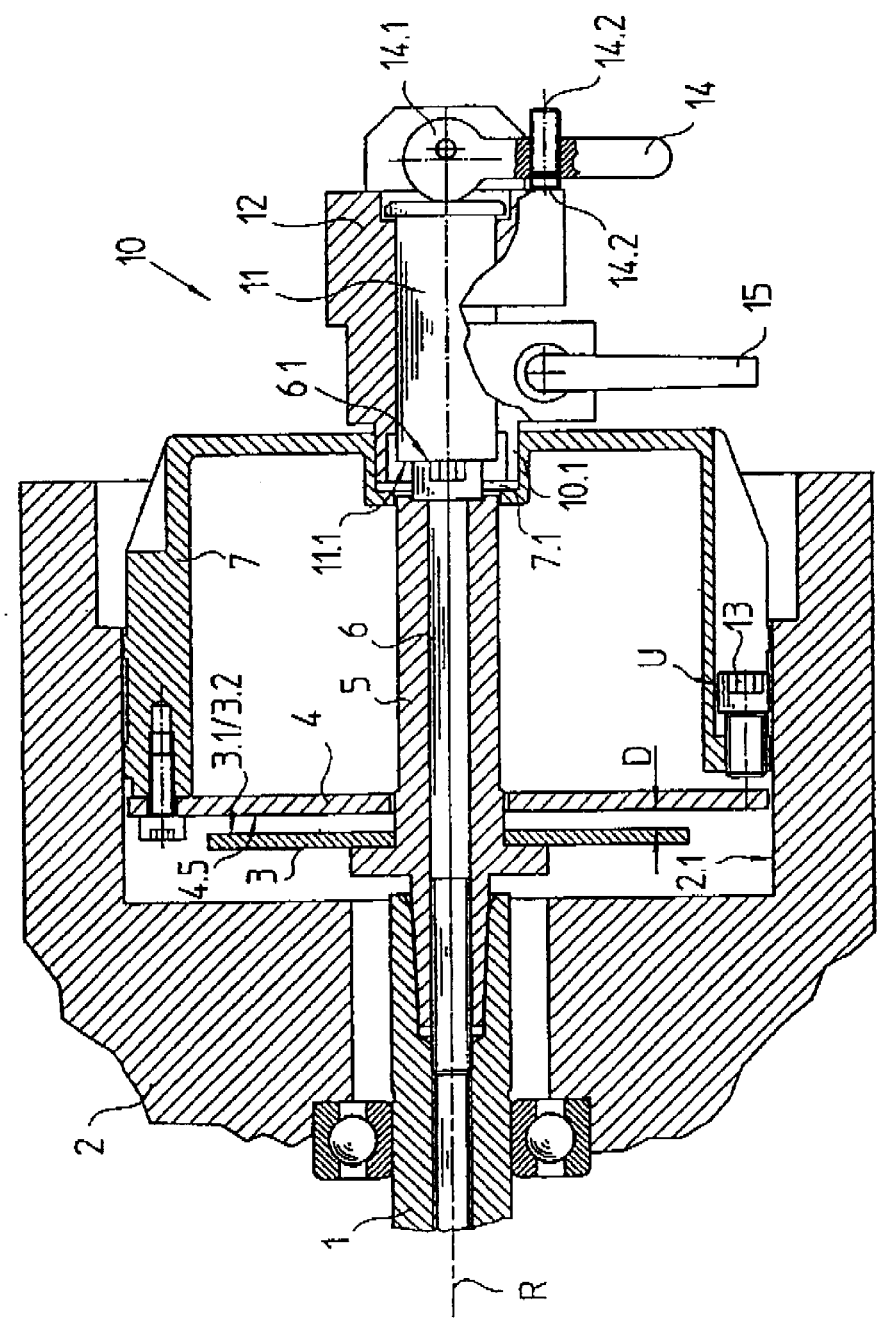
FIG. 2 shows the angle measuring device of FIG. 1 in a second assembly position.

Once the positioning device has been fixed, one of the two parts 11 is displaced relative to the other part 12 into the second reference position. In this process, the first part 11 is braced on the screw 6. However, the part 11 can also be braced on some other region of the rotor unit 3, 5, 6, or on the second object 2. This displacement is transmitted, because of the axial fixation, to the disk 3 and the scanning element 4. This second assembly position is shown in FIG. 2.

An especially advantageous aspect is that the displacement distance is predetermined solely by the positioning device 10. This is achieved by the provision that for the axial fixation of at least one of the two parts 11, 12, no axially acting stop face is provided on the angle measuring device; instead, the fixation is effected by radial clamping, for instance in that the part 12 is radially spread open in a bore 7.1 of the support 7. Thus, the positioning means 10 remains axially freely positionable at least relative to the support 7.

In a manner not shown, the fixation in the axial direction between the stator unit 4, 7 and the part 12 can alternatively be done by axially acting stop faces; the part 11 is embodied to be axially freely positionable relative to an element 3, 5, 6 of the rotor unit and can be clamped in an arbitrary axial position on an axially extending face of the hub 5.

Figure 8:
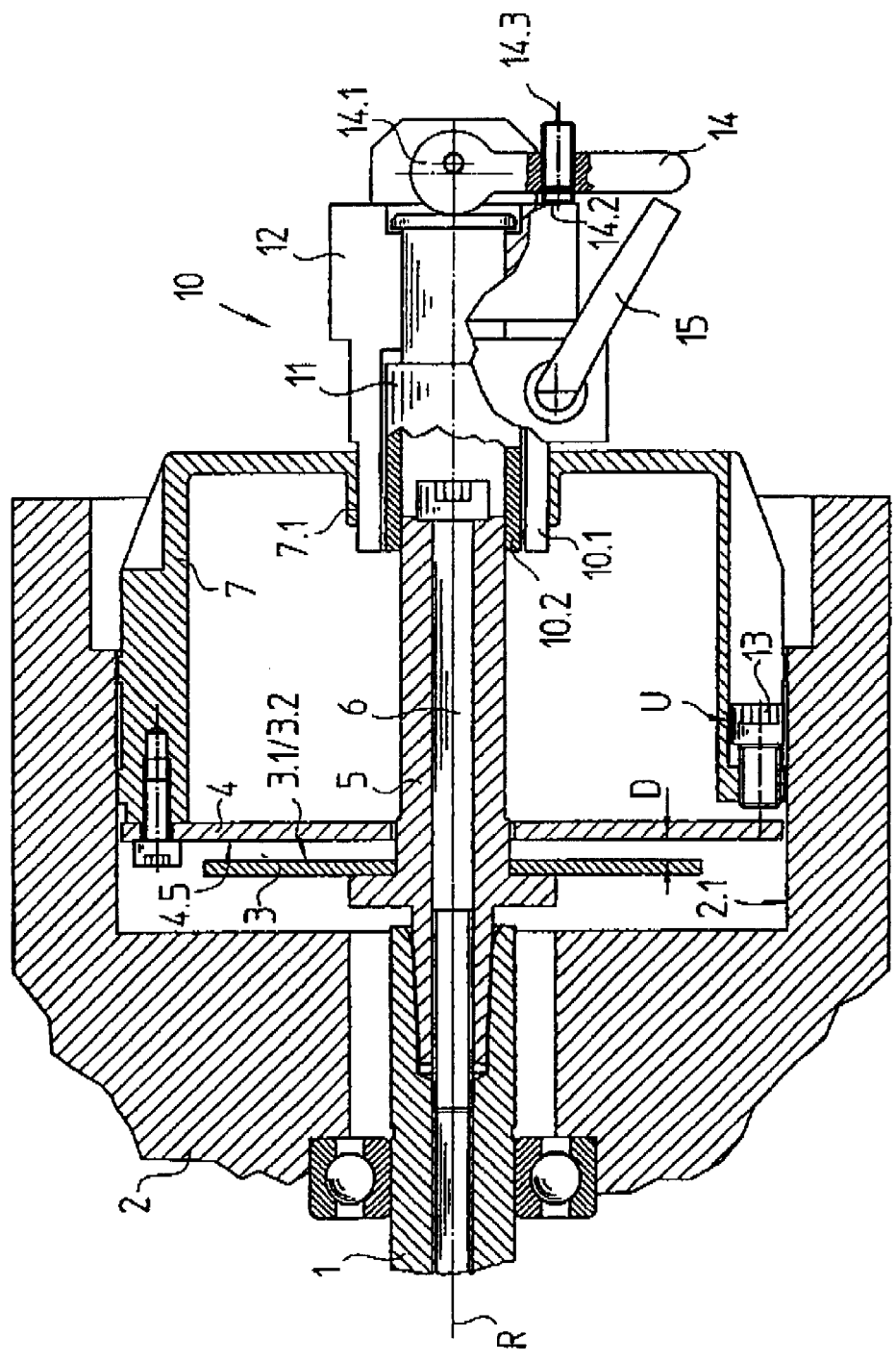
FIG. 8 a cross-sectional view a second example of an angle measuring device according to the present invention.

In FIG. 8, a further alternative version of the fixation-is shown. No axially acting stop faces on the angle measuring device are provided for the axial fixation; instead, the fixation of the part 11 on an axially extending face of the hub 5 and the fixation of the part 12 on an also axially extending face of the support 7 are effected by clamping. The receptacle 10.1 of the part 12 is spread open radially in the bore 7.1 of the support 7 by the actuator 15. The part 11 likewise has a receptacle 10.2, which is spread radially inward by an actuator not shown and is thus clamped to the outer face of the hub 5. The actuators 15 can be embodied as levers or as drive mechanisms. The receptacles 10.1, 10.2 preferentially clamp radially or radially-symmetrically against a plurality of locations offset from one another.

In the state shown in FIG. 2, the stator unit 4, 7 of the angle measuring device is connected to the stator 2 of the motor. This connection can be made by screws or clamps. Radially clamping the support 7 to an inside face 2.1 of the stator 2 is especially advantageous. To that end, at least one clamping element in the form of an eccentric screw 13 is provided on the support 7. The head of this eccentric screw 13 has an eccentrically extending circumferential face U, which by rotation enters into contact with the inside face 2.1 and engenders a radial clamping force between the support 7 and the stator 2.

In a manner not shown, the support 7 can also be embodied in slotted form for the sake of the radial clamping; a spreader element engages the slot and spreads it open or in other words increases the diameter of the support 7. Other examples for radial clamping are described in EP 0 762 082 A1, the entire contents of which are hereby expressly incorporated by reference.

The radial clamping between the stator 2 and the support 7 is especially advantageous if the angle measuring device is to be used directly in a tube of a drive unit, in particular of an electric motor, since in this assembly no fastening bores on the motor are needed. In that case, the stator 2 is the housing or flange, or the motor bearing plate, of the electric motor.

Radial clamping device clamping or spreading in a direction that extends at least largely perpendicular to the pivot axis R, or in other words perpendicular to the axial direction.

Figure 3:
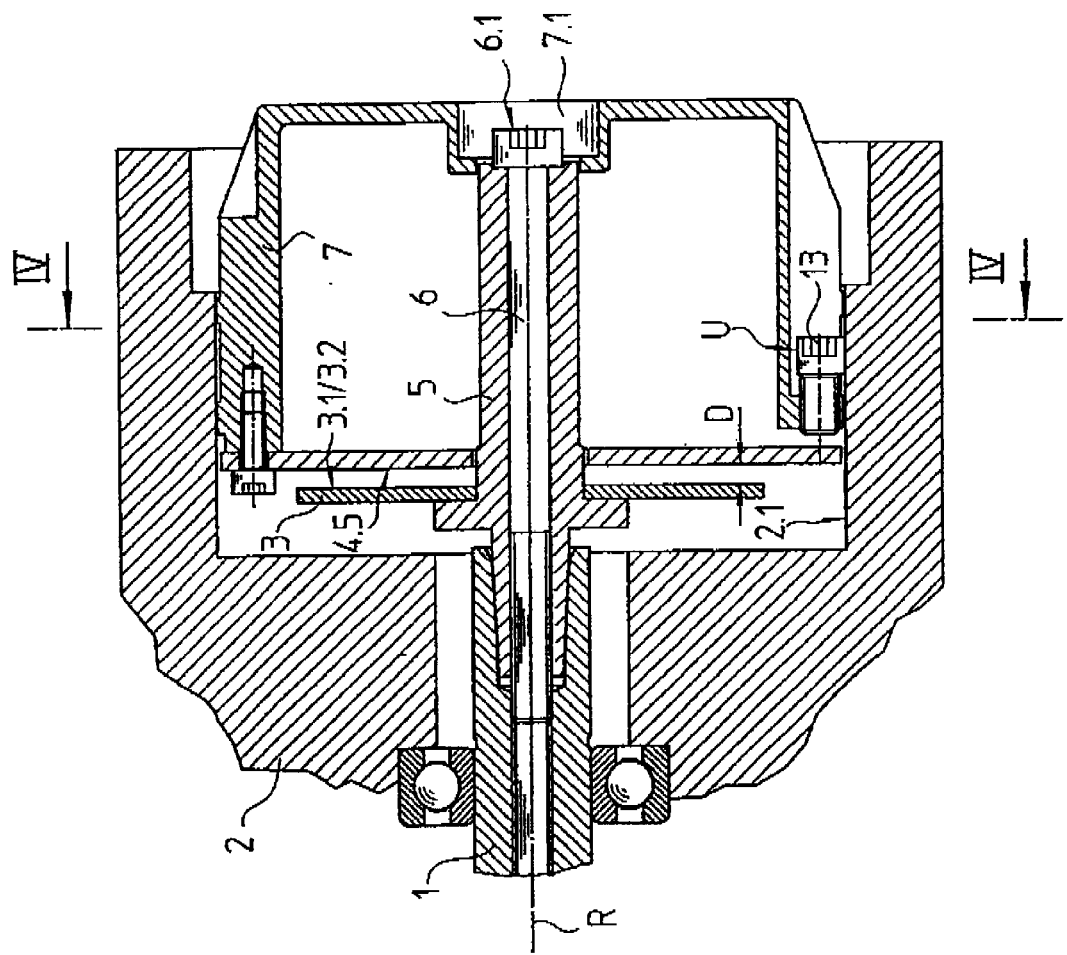
FIG. 3 shows the angle measuring device of FIG. 1 in an operating position.
Figure 4:
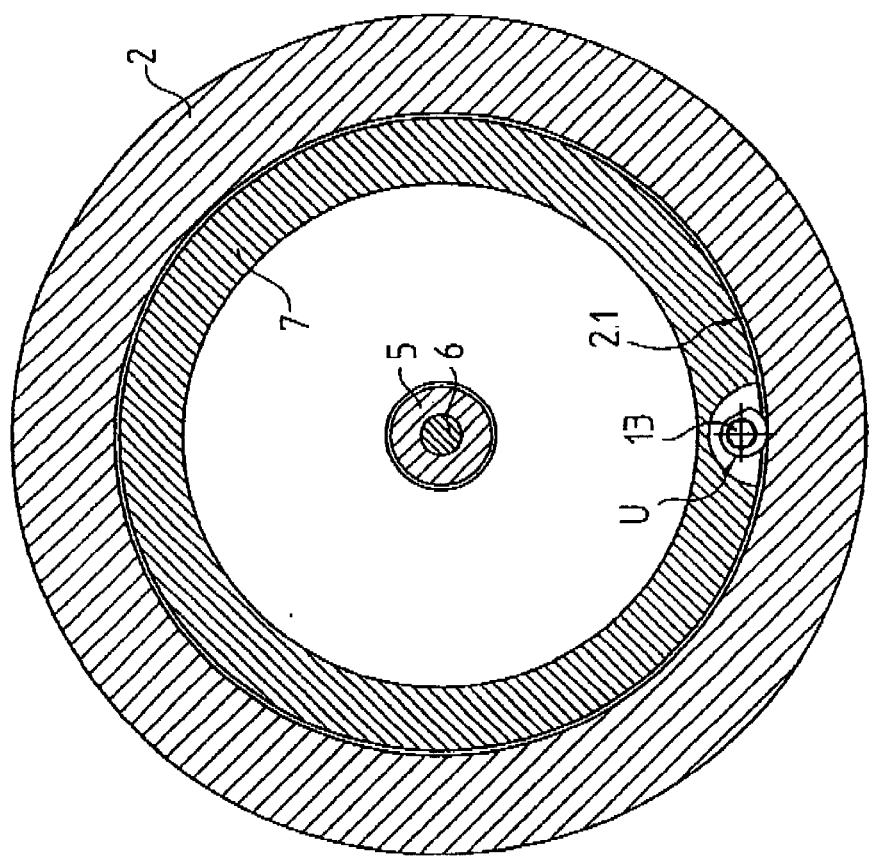
FIG. 4 shows a cross-sectional view of the angle measuring device of FIG. 1 taken along line IV—IV of FIG. 3.
Figure 5:
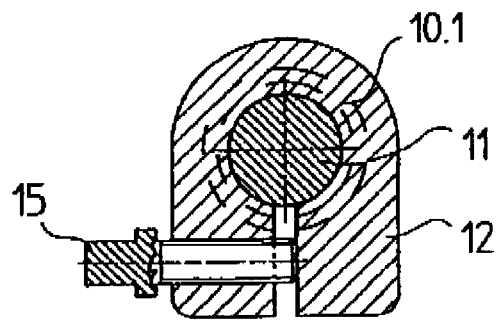
FIG. 5 shows a cross-sectional of the angle measuring device of FIG. 1 taken along line V—V of FIG. 1.

Once the stator unit 4, 7 of the angle measuring device has been fastened to the stator 2 of the motor, the fixation of the positioning device 10 to the angle measuring device is undone, and the positioning device 10 is removed. This operating position of the completely installed angle measuring device is shown in FIG. 3.

Several exemplary embodiments of the positioning device 10 will now be described in further detail. In the case of the positioning device 10 shown in FIGS. 1, 2, 5 and 8, the axial displacement is achieved by shifting a lever 14. In the shifting of the lever 14, the cam disk 14.1 effects the displacement of the part 11 relative to the part 12. The reference positions that define the adjustment distance are predetermined by stops 14.2, 14.3 that for instance are settable. The receptacle 10.1 is a slotted annular body which can be spread open by a lever 15. In the sectional view V—V FIG. 5 only the positioning device 10 is shown, for the sake of simplicity.

Figure 6:
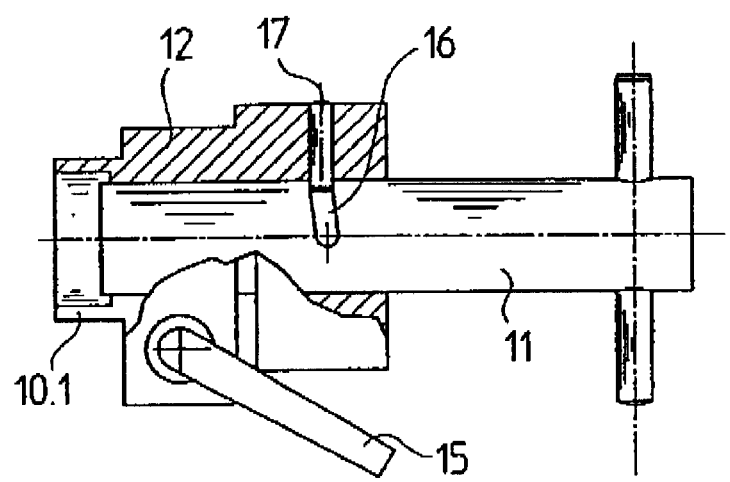
FIG. 6 shows a second embodiment of a further positioning device according to the present invention.

In FIG. 6, a further positioning device 10 is shown. The adjusting distance is predetermined by an oblique groove 17, which is engaged by a pin 16. By mutual rotation of the two parts 11, 12 about the pivot axis R, the two parts 11, 12 are displaced axially relative to one another.

Figure 7:
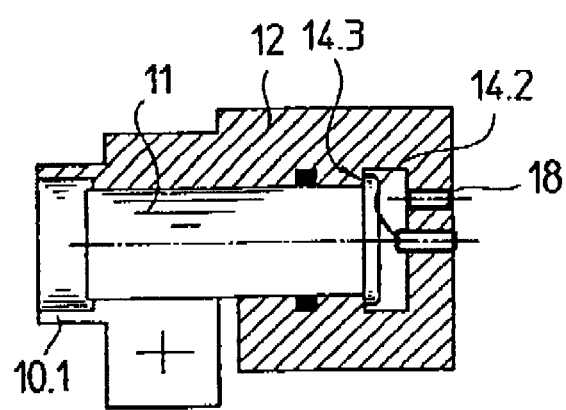
FIG. 7 shows a third embodiment of a pneumatically driven positioning device according to the present invention.

In FIG. 7, a positioning device 10 with a pneumatic drive mechanism is shown. To that end, the part 11 is displaced by compressed air, with a compressed air connection 18 being provided. The reference positions are again predetermined by stops 14.2, 14.3.

Still other drive mechanisms and actuators can be used for adjusting the part 11, such as lifting magnets, piezoelectric elements, hydraulic cylinders, control motors, and stepping motors. The adjustment can thus also be automated.

Figure 9:
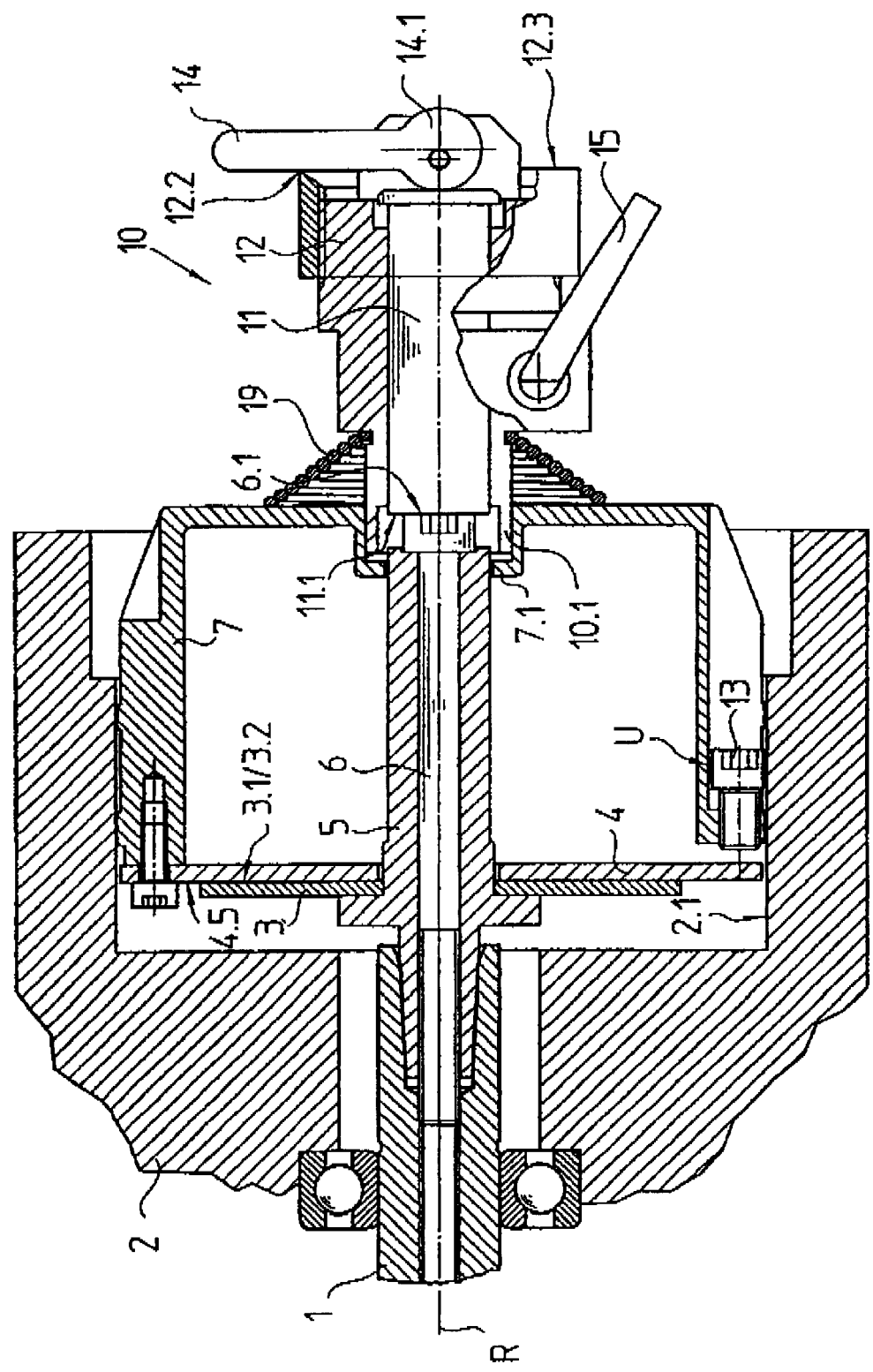
FIG. 9 a cross-sectional view a third example of an angle measuring device.

The third example in FIG. 9 largely corresponds to the first example of FIG. 1, so that only the differences between them will now be described. The stops 14.2 and 14.3 for defining the adjustment distance of the part 11 are replaced in this example by stops 12.2 and 12.3, which together are realized in the form of a sleeve that is slipped onto the part 12 and preferably screwed on and fixed. The adjustment distance and thus the reference positions of the part 11 relative to the part 12 are predetermined by the stop faces 12.2, 12.3 of the sleeve, which cooperate with faces of the lever 14.

To assure that in all attachment positions, the support 7 at the instant of clamping of the part 12 to the support 7 rests in a defined way on the disk 3, an elastic contact-pressure element 19 is provided between the positioning device 10 and the support 7. This contact-pressure element 19 is braced on the part 12 and forces the stop face 4.5 against the stop face 3.1 in a defined way. The axially acting, elastic contact-pressure element is for instance a cone spring 19, an elastic intermediate ring made of plastic (O-ring), or a cup spring.

In the examples described, the scanning of the disk 3 is done by the inductive principle; the scanning element 4 is a printed circuit board, on whose surface exciter and sensor windings are mounted. The disk 3 includes nonconductive material, and an incremental grating 3.2 of electrically conductive regions spaced apart from one another is mounted on the plane 3.1.

Instead of the scanning element 4 being a printed circuit board other inductive or magnetic-field-sensitive, capacitive, or photosensitive scanning elements can be used as well. In the case of photoelectric position measuring devices, the scanning element can also merely be a scanner plate (diaphragm or shutter with a grating) known per se or a semiconductor substrate with a plurality of photosensitive regions.

The invention can also be used in devices for measuring length.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

What is claimed is:

1. A method for assembling a position measuring device, in which a scanning element is fastened to a first object, and a scale comprising a measurement division is fastened to a further object, a fastening between the scale and the further object being done while maintaining a predetermined scanning distance between the measurement division and the scanning element, wherein the scanning distance is set by:

positioning the scanning element at a first reference position relative to the scale;

positioning a first part and a second part of a positioning device at a second reference position;

fixing the first part of the positioning device directly or indirectly to the scale;

fixing the second part of the positioning device directly or indirectly to the scanning element in a direction of motion along the scanning distance; and moving the first part of the positioning device relative to the second part of the positioning device by a predetermined distance in a direction of the scanning distance so that the scanning element is put into a second reference position relative to the scale, in which position a requisite scanning distance is accomplished.

2. The method of claim 1, further comprising fastening the scanning element in the second reference position to the first object.

3. The method of claim 2, further comprising undoing the fixing of the first part of the positioning device to the scale and undoing the fixing of the second part of the positioning device to the scanning element.

4. The method of claim 3, comprising removing the positioning device from the position measuring device.

5. The method of claim 1, wherein the first and second parts of the positioning device are movable relative to one another in the direction of the scanning distance.

6. The method of claim 1, wherein fixing of the first part comprises:

placing a stop face, extending transversely to the scanning distance, into contact with a stop face of the first part that extends transversely to the scanning distance.

7. The method of claim 6, wherein fixing of the second part comprises:

clamping the second part to a face, extending in the direction of the scanning distance.

8. The method of claim 1, wherein fixing of the second part comprises:

clamping the second part to a face, extending in the direction of the scanning distance.

9. The method of claim 1, wherein fixing of the second part comprises:

placing a stop face, extending transversely to the scanning distance, into contact with a stop face of the second part that extends transversely to the scanning distance.

10. The method of claim 9, wherein fixing of the first part comprises:

clamping the first part to a face, extending in the direction of the scanning distance.

11. The method of claim 1, wherein fixing of the first part comprises:

clamping the first part to a face, extending in the direction of the scanning distance.

12. The method of claim 1, wherein fixing of the first part comprises:

clamping a stop face, extending transversely to the scanning distance, into contact with a stop face of the first part that extends transversely to the scanning distance.

13. The method of claim 12, wherein fixing of the second part comprises:

clamping the second part to a face, extending in the direction of the scanning distance.

14. The method of claim 1, wherein fixing of the second part comprises:

clamping the second part to a face, extending in the direction of the scanning distance.

15. The method of claim 1, wherein the position measuring device is an angle measuring device wherein the scale comprises a disk attached to a rotor unit and the scanning element is attached to a stator unit.

16. The method of claim 15, further comprising:

coupling the rotor unit to the further object in a rotationally rigid manner;

positioning the scanning element relative to the disk in the first reference position, wherein the first reference position is defined by cooperation of a stop face, extending transversely to the scanning distance, of the rotor unit and a stop face of the stator unit;

wherein the fixing of the first part of the positioning device is performed by placing a stop face, extending transversely to the scanning distance, of the rotor unit into contact with a stop face, extending transversely to the scanning distance, of the first part; and wherein the fixing of the second part of the positioning device is performed by clamping the second part to a face, extending in the direction of the scanning distance, of the stator unit.

17. The method of claim 16, further comprising coupling the stator unit to the first object in a rotationally rigid manner.

18. The method of claim 16, further comprising undoing the fixing of the positioning device.

19. The method of claim 18, comprising removing the positioning device from the angle measuring device.

20. The method of claim 16, wherein the relative motion of the first part with respect to the second part of the positioning device is performed by a drive mechanism.

21. The method of claim 20, wherein the drive mechanism is chosen from one of the following: a piezoelectric, hydraulic, pneumatic, or electric-motor drive mechanism.

22. The method of claim 16, wherein the scanning element is fastened to the first object by radially clamping the scanning element to a face, extending in the direction of the scanning distance, of the first object.

23. The method of claim 16, wherein the scanning element is forced the first reference position by an elastic contact-pressure element that exerts force in the direction of the scanning distance and that is braced on the positioning device.

24. The method of claim 1, wherein the moving the first part of the positioning device relative to the second part of the positioning device is performed by a drive mechanism.

25. The method of claim 24, wherein the drive mechanism is chosen from one of the following: a piezoelectric, hydraulic, pneumatic, or electric-motor drive mechanism.

26. The method of claim 1, wherein the scanning element is fastened to the first object by radially clamping the scanning element to a face, extending in the direction of the scanning distance, of the first object.

27. The method of claim 1, wherein the scanning element is forced into the first reference position by an elastic contact-pressure element that exerts force in the direction of the scanning distance and that is braced on the positioning device.

28. A method for assembling an angle measuring device, in which a scanning element is fastened to a first object, and a disk comprising a measurement division is fastened to a further object, the method comprising:

coupling the disk to the further object in a rotationally rigid manner;

positioning the scanning element relative to the disk in a first position;

fixing a first part of a positioning device to the disk;

fixing a second part of the positioning device to the scanning element;

displacing the first part relative to the second part of the positioning device, thereby positioning the scanning element in a second position;

coupling the scanning element in the second position to the first object in a rotationally rigid manner by radially clamping the scanning element to a face of the first object;

undoing the fixing of the first part and the fixing of the second part; and removing the positioning device from the angle measuring device.

\* \* \* \* \*